United States Patent
Maeda et al.

(10) Patent No.: US 11,034,821 B2
(45) Date of Patent: Jun. 15, 2021

(54) RUBBER COMPOSITIONS

(71) Applicant: KURARAY CO., LTD., Kurashiki (JP)

(72) Inventors: Hiromi Maeda, Chiyoda-ku (JP); Daisuke Koda, Kamisu (JP); Hiroshi Kanbara, Chiyoda-ku (JP); Satomi Ohta, Chiyoda-ku (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 16/329,567

(22) PCT Filed: Sep. 1, 2017

(86) PCT No.: PCT/JP2017/031561
§ 371 (c)(1),
(2) Date: Feb. 28, 2019

(87) PCT Pub. No.: WO2018/043700
PCT Pub. Date: Mar. 8, 2018

(65) Prior Publication Data
US 2019/0218376 A1   Jul. 18, 2019

(30) Foreign Application Priority Data
Sep. 2, 2016 (JP) .............................. JP2016-171606

(51) Int. Cl.
*B60C 1/00* (2006.01)
*C08L 9/06* (2006.01)
*C08C 19/25* (2006.01)
*C08K 3/04* (2006.01)
*C08K 3/36* (2006.01)
*C08L 15/00* (2006.01)
*C08L 21/00* (2006.01)
*C08L 7/00* (2006.01)
*C08K 3/013* (2018.01)

(52) U.S. Cl.
CPC ..................................... *C08L 9/06* (2013.01); *B60C 1/00* (2013.01); *C08C 19/25* (2013.01); *C08K 3/04* (2013.01); *C08K 3/36* (2013.01); *C08L 7/00* (2013.01); *C08L 15/00* (2013.01); *C08L 21/00* (2013.01); *C08K 3/013* (2018.01); *C08L 2312/00* (2013.01); *Y02T 10/86* (2013.01)

(58) Field of Classification Search
None
See application file for complete search history.

(56) References Cited

U.S. PATENT DOCUMENTS

| | | | | |
|---|---|---|---|---|
| 9,492,363 | B1* | 11/2016 | Lueschen | A61Q 5/00 |
| 2005/0148694 | A1* | 7/2005 | Inata | C08G 59/027 |
| | | | | 523/400 |
| 2007/0110978 | A1* | 5/2007 | Kawaguchi | C08L 2666/02 |
| | | | | 428/292.1 |
| 2008/0254385 | A1* | 10/2008 | Yamazawa | G03F 7/033 |
| | | | | 430/286.1 |
| 2008/0314495 | A1* | 12/2008 | Uesaka | C08L 15/00 |
| | | | | 152/525 |
| 2014/0080978 | A1* | 3/2014 | Ohi | C08L 15/00 |
| | | | | 525/332.1 |

FOREIGN PATENT DOCUMENTS

| | | |
|---|---|---|
| CN | 101240090 A | 8/2008 |
| CN | 104487506 A | 4/2015 |
| EP | 0 311 252 A2 | 4/1989 |
| JP | 61-197646 A | 9/1986 |
| JP | 2000-344949 A | 12/2000 |
| JP | 2002-114874 A | 4/2002 |
| JP | 2010189613 A | 9/2010 |
| JP | 2013-249359 A | 12/2013 |
| JP | 2013249359 A * | 12/2013 |
| JP | 5507990 B2 | 5/2014 |
| JP | 2015-086280 A | 5/2015 |
| WO | WO 2008/145155 A1 | 12/2008 |
| WO | WO-2008145155 A1 * | 12/2008 .............. C08K 3/36 |

OTHER PUBLICATIONS

Liquid rubber (LIR) a crosslinkable plasticiser, Bohm, et al., Rubber, Fibers Plastics International, vol. 4, Jun. 2009, pp. 152-156 (Year: 2009).*
Extended European Search Report dated Dec. 16, 2019 in European Patent Application No. 17846703.1 (8 pages).
International Search Report dated Dec. 5, 2017 in PCT/JP2017/031561, 1 page.
Office Action in CN Application No. 201780053284.2, dated Sep. 3, 2020, 8pp.

* cited by examiner

*Primary Examiner* — Peter A Salamon
(74) *Attorney, Agent, or Firm* — Hauptman Ham, LLP

(57) ABSTRACT

A rubber composition includes 100 parts by mass of a solid rubber (A), 0.1 to 50 parts by mass of a modified liquid diene rubber (B) having a functional group derived from a silane compound represented by the formula (1), and 20 to 200 parts by mass of a filler (C), the modified liquid diene rubber (B) satisfying (i) to (iii) below: (i) The weight average molecular weight (Mw) is 15,000 to 120,000. (ii) The vinyl content is not more than 70 mol %. (iii) The average number of functional groups per molecule of the modified liquid diene rubber (B) is 1 to 30.

10 Claims, No Drawings

RUBBER COMPOSITIONS

TECHNICAL FIELD

The present invention relates to rubber compositions.

BACKGROUND ART

Fillers such as silicas and carbon blacks are conventionally added to rubber components such as natural rubbers and styrene butadiene rubbers to enhance mechanical strength. Such rubber compositions are widely used in applications including tires which require abrasion resistance and mechanical strength. How well a filler is dispersed in a crosslinked product of a filled rubber composition has been pointed out to be a possible factor which affects the properties (for example, mechanical properties, abrasion resistance and rolling resistance) of the crosslinked product. However, such filled rubber compositions often suffer poor filler dispersibility because of the facts that fillers do not always exhibit good affinity for rubbers and that filler molecules interact with one another. In such cases, the state in which the filler is dispersed in crosslinked products is often not ideal for attaining enhanced properties.

To enhance the filler dispersibility in a rubber composition, various approaches which involve a liquid rubber having a functional group have been studied (see, for example, Patent Literatures 1 and 2).

Unfortunately, crosslinked products obtained from a rubber composition have some properties which cannot be enhanced at the same time (for example, it is difficult to enhance both abrasion resistance and rolling resistance simultaneously). In this regard, the existing techniques still have room for improvement.

Further, the enhancements in such properties are probably associated with how well a filler is dispersed in a crosslinked product. The existing techniques still have room for improvement in terms of, for example, how to sufficiently reduce the Payne effect which is a measure of how well a filler is dispersed in a rubber composition.

CITATION LIST

Patent Literature

Patent Literature 1: JP-A-2000-344949
Patent Literature 2: JP-A-2013-249359

SUMMARY OF INVENTION

Technical Problem

The present invention has been made in light of the circumstances discussed above. The present invention provides a rubber composition which can give a crosslinked product with excellent properties including abrasion resistance and mechanical strength such as tensile strength by virtue of a filler being dispersed in the crosslinked product in a state that is ideal for properties enhancements. The present invention also provides a crosslinked product of the rubber composition, and a tire which includes a portion including the composition or the crosslinked product and which attains enhanced rolling resistance performance and enhanced steering stability.

Solution to Problem

After extensive studies, the present inventors have found that the addition of a specific modified liquid diene rubber to a rubber composition allows the rubber composition to give a crosslinked product which attains excellent properties including mechanical strength such as tensile strength, and abrasion resistance by virtue of a filler being dispersed in the crosslinked product in a state that is ideal for properties enhancements. The present inventors have further found that a tire which includes a portion including the composition or the crosslinked product attains enhanced steering stability and enhanced rolling resistance performance. The present invention has been completed based on these findings.

The present invention pertains to the following [1] to [7].

[1] A rubber composition comprising 100 parts by mass of a solid rubber (A), 0.1 to 50 parts by mass of a modified liquid diene rubber (B) having a functional group derived from a silane compound represented by the formula (1) below, and 20 to 200 parts by mass of a filler (C), the modified liquid diene rubber (B) satisfying (i) to (iii) below:

(i) the weight average molecular weight (Mw) is 15,000 to 120,000, (ii) the vinyl content is not more than 70 mol %, and (iii) the average number of functional groups per molecule of the modified liquid diene rubber (B) is 1 to 30,

[Chem. 1]

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

[2] The rubber composition described in [1], wherein the melt viscosity of the modified liquid diene rubber (B) at 38° C. is 1 to 4,000 Pa·s.

[3] The rubber composition described in [1] or [2], wherein the modified liquid diene rubber (B) is a polymer comprising a monomer unit derived from isoprene and/or butadiene.

[4] The rubber composition described in any one of [1] to [3], wherein the solid rubber (A) is one or more selected from natural rubbers, styrene butadiene rubbers, butadiene rubbers and isoprene rubbers.

[5] The rubber composition described in any one of [1] to [4], wherein the filler (C) is at least one selected from carbon blacks and silicas.

[6] A crosslinked product obtained by crosslinking the rubber composition described in any one of [1] to [5].

[7] A tire comprising, as at least a portion of the tire, the rubber composition described in any one of [1] to [5] or the crosslinked product described in [6].

Advantageous Effects of Invention

The rubber composition of the present invention can give a crosslinked product which exhibits excellent properties including mechanical strength such as tensile strength, and abrasion resistance by virtue of the filler being dispersed in the crosslinked product in a state that is ideal for properties enhancements. Further, the composition or the crosslinked product can give, for example, a tire which attains enhanced steering stability and enhanced rolling resistance performance.

DESCRIPTION OF EMBODIMENTS

[Solid Rubbers (A)]

The solid rubber (A) used in the rubber composition of the invention is a rubber that can be handled as a solid at 20° C. The Moony viscosity $ML_{1+4}$ of the solid rubber (A) at 100° C. is usually in the range of 20 to 200. Examples of the solid rubbers (A) include natural rubbers, styrene butadiene rubbers (hereinafter, also written as "SBRs"), butadiene rubbers, isoprene rubbers, butyl rubbers, halogenated butyl rubbers, ethylene propylene diene rubbers, butadiene acrylonitrile copolymer rubbers, chloroprene rubbers, acrylic rubbers, fluororubbers and urethane rubbers. Of these solid rubbers (A), natural rubbers, SBRs, butadiene rubbers and isoprene rubbers are preferable, and natural rubbers and SBRs are more preferable. The solid rubbers (A) may be used singly, or two or more may be used in combination.

To ensure that the obtainable rubber composition and crosslinked products will exhibit desired properties sufficiently, the number average molecular weight (Mn) of the solid rubber (A) is preferably not less than 80,000, and more preferably in the range of 100,000 to 3,000,000. In the present specification, the number average molecular weight is a polystyrene equivalent number average molecular weight measured by gel permeation chromatography (GPC).

Examples of the natural rubbers include those natural rubbers, high-purity natural rubbers and modified natural rubbers such as epoxidized natural rubbers, hydroxylated natural rubbers, hydrogenated natural rubbers and grafted natural rubbers generally used in the tire industry, with specific examples including TSRs (technically specified rubbers) such as SMRs (TSRs from Malaysia), SIRs (TSRs from Indonesia) and STRs (TSRs from Thailand), and RSSs (ribbed smoked sheets). Of these, SMR 20, STR 20 and RSS #3 are preferable from the points of view of uniform quality and high availability. The natural rubbers may be used singly, or two or more may be used in combination.

The SBRs may be any such rubbers generally used in tire applications. Specifically, those rubbers having a styrene content of 0.1 to 70 mass % are preferable, and the styrene content is more preferably 5 to 50 mass %, and still more preferably 15 to 35 mass %. Further, those rubbers having a vinyl content of 0.1 to 60 mass % are preferable, and the vinyl content is more preferably 0.1 to 55 mass %.

The weight average molecular weight (Mw) of the SBRs is preferably 100,000 to 2,500,000, more preferably 150,000 to 2,000,000, and still more preferably 200,000 to 1,500,000. This molecular weight ensures that processability and mechanical strength are satisfied at the same time. In the present specification, the weight average molecular weight is a polystyrene equivalent weight average molecular weight measured by gel permeation chromatography (GPC).

The SBRs used in the invention preferably have a glass transition temperature of −95 to 0° C., and more preferably −95 to −5° C. as measured by differential thermal analysis. With the glass transition temperature being limited to the above range, the viscosity of the SBR allows easy handling of the rubber.

SBR which may be used in the invention may be obtained by copolymerizing styrene and butadiene. The SBR production process is not particularly limited and may be any of emulsion polymerization, solution polymerization, gas-phase polymerization and bulk polymerization. Of these production processes, emulsion polymerization and solution polymerization are preferable.

An emulsion-polymerized styrene butadiene rubber (hereinafter, also written as E-SBR) may be produced by a usual emulsion polymerization process that is known or is deemed as known. For example, such a rubber may be obtained by emulsifying and dispersing prescribed amounts of styrene and butadiene monomers in the presence of an emulsifier and emulsion polymerizing the monomers with a radical polymerization initiator.

A solution polymerized styrene butadiene rubber (hereinafter, also written as S-SBR) may be produced by a usual solution polymerization process. For example, styrene and butadiene are polymerized in a solvent with an active metal capable of catalyzing anionic polymerization optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. It is usually preferable to use the solvent in such an amount that the monomer concentration will be 1 to 50 mass %.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of these active metals, alkali metals and alkaline earth metals are preferable, and alkali metals are more preferable. Of the alkali metals, organoalkali metal compounds are more preferably used.

Examples of the organoalkali metal compounds include organomonolithium compounds such as n-butyllithium, sec-butyllithium, t-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithiobenzene; sodium naphthalene and potassium naphthalene. In particular, organolithium compounds are preferable, and organomonolithium compounds are more preferable. The amount in which the organoalkali metal compounds are used may be determined appropriately in accordance with the desired molecular weight of S-SBR. The organoalkali metal compound may be used in the form of an organoalkali metal amide by being subjected to a reaction with a secondary amine such as dibutylamine, dihexylamine or dibenzylamine.

The polar compounds are not particularly limited as long as the compounds do not deactivate the anionic polymerization reaction and are generally used for the purposes of controlling the microstructure of butadiene moieties and controlling the distribution of styrene in copolymer chains. Examples include ether compounds such as dibutyl ether, tetrahydrofuran and ethylene glycol diethyl ether; tertiary amines such as tetramethylethylenediamine and trimethylamine; alkali metal alkoxides and phosphine compounds.

The temperature of the polymerization reaction is usually in the range of −80 to 150° C., preferably 0 to 100° C., and more preferably 30 to 90° C. The polymerization mode may be batchwise or continuous. To enhance the random copolymerizability of styrene and butadiene, it is preferable to supply styrene and butadiene into the reaction liquid continuously or intermittently so that styrene and butadiene in the polymerization system will have a specific composition ratio.

The polymerization reaction may be terminated by the addition of an alcohol such as methanol or isopropanol as a polymerization terminator. After the termination of the polymerization reaction, the target S-SBR may be recovered by separating the solvent from the polymerization solution by a method such as direct drying or steam stripping. The polymerization solution may be mixed together with an extender oil before the removal of the solvent, and the rubber may be recovered as an oil-extended rubber.

As long as the advantageous effects of the invention are not impaired, the SBR may be a modified SBR obtained by introducing functional groups into SBR. Examples of the functional groups include amino groups, alkoxysilyl groups, hydroxyl groups, epoxy groups and carboxyl groups.

For example, the modified SBR may be produced by adding, before the addition of the polymerization terminator, an agent capable of reacting with active ends of the polymer, for example, a coupling agent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane or 2,4-tolylene diisocyanate, a chain end-modifying agent such as 4,4'-bis(diethylamino)benzophenone or N-vinylpyrrolidone, or any of modifying agents described in JP-A-2011-132298. In the modified SBR, the functional groups may be introduced at polymer ends or polymer side chains.

Examples of the butadiene rubbers include commercially available butadiene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed butadiene rubbers are preferable because they have a high cis content. Use may be made of ultrahigh cis butadiene rubbers obtained using lanthanoid rare earth metal catalysts.

The vinyl content in the butadiene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −40° C., and more preferably not more than −50° C.

The weight average molecular weight (Mw) of the butadiene rubbers is preferably 90,000 to 2,000,000, and more preferably 150,000 to 1,500,000. This Mw ensures that high processability and mechanical strength are obtained.

As long as the advantageous effects of the invention are not impaired, the butadiene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

Examples of the isoprene rubbers include commercially available isoprene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed isoprene rubbers are preferable because they have a high cis content. Use may be made of ultrahigh cis isoprene rubbers obtained using lanthanoid rare earth metal catalysts.

The vinyl content in the isoprene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −20° C., and more preferably not more than −30° C.

The weight average molecular weight (Mw) of the isoprene rubbers is preferably 90,000 to 2,000,000, and more preferably 150,000 to 1,500,000. This Mw ensures that high processability and mechanical strength are obtained.

As long as the advantageous effects of the invention are not impaired, the isoprene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

[Modified Liquid Diene Rubbers (B)]

The modified liquid diene rubber (B) used in the inventive rubber composition is a liquid polymer which has a weight average molecular weight (Mw) of 15,000 to 120,000, has a vinyl content of not more than 70 mol %, and has a functional group derived from a silane compound represented by the aforementioned formula (1), the average number of functional groups per molecule of the modified liquid diene rubber (B) being in the range of 1 to 30. In the rubber composition of the invention, the incorporation of the modified liquid diene rubber (B) allows the filler (C) to be dispersed in the rubber composition in a state that is ideal for a crosslinked product of the rubber composition to exhibit desired properties. In some cases, for example, the filler (C) is excellently dispersed in the rubber composition so that a crosslinked product of the rubber composition attains a sufficient reduction in Payne effect. Further, the mechanical strength such as abrasion resistance of crosslinked products of the rubber composition is enhanced. When, for example, such a crosslinked product is used in a tire or the like, steering stability and rolling resistance performance are enhanced. Although detailed mechanisms are not clear, it is probable that the modified liquid diene rubber (B) has high reactivity with respect to the filler (C) described later and easily bonds to the filler (C) in the rubber composition. Consequently, the filler (C) is less likely to be aggregated and is allowed to be dispersed in the rubber composition in a state that is ideal for a crosslinked product of the rubber composition to exhibit desired properties. That is, for example, the dispersibility of the filler (C) in the rubber composition is improved, and a crosslinked product of the rubber composition attains a sufficient reduction in Payne effect. Further, crosslinked products of the rubber composition attain excellent mechanical strength such as abrasion resistance probably because the modified liquid diene rubber (B) can be well entangled with the solid rubber.

An unmodified liquid diene rubber (B') that is a raw material for the modified liquid diene rubber (B) contains conjugated diene units as monomer units constituting the polymer. Examples of the conjugated dienes include butadiene; isoprene; and conjugated dienes (b1) except butadiene and isoprene, such as 2,3-dimethylbutadiene, 2 phenylbutadiene, 1,3-pentadiene, 2-methyl-1,3-pentadiene, 1,3- hexadiene, 1,3-octadiene, 1,3-cyclohexadiene, 2-methyl-1, 3-octadiene, 1,3,7-octatriene, myrcene and chloroprene. The conjugated diene units in the unmodified liquid diene rubber (B') preferably include monomer units derived from butadiene and/or isoprene.

The unmodified liquid diene rubber (B') serving as a raw material for the modified liquid diene rubber (B) preferably contains monomer units derived from butadiene and/or isoprene in an amount of not less than 50 mass % relative to all the monomer units constituting the polymer. The total content of butadiene units and isoprene units is preferably 60 to 100 mass %, and more preferably 70 to 100 mass % relative to all the monomer units forming the liquid diene rubber (B').

Besides the butadiene units and the isoprene units, the liquid diene rubber (B') may contain other monomer units such as units from the aforementioned conjugated dienes (b1) except butadiene and isoprene, and units from aromatic vinyl compounds (b2).

Examples of the aromatic vinyl compounds (b2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl) styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Of these aromatic vinyl compounds, styrene, α-methylstyrene and 4-methylstyrene are preferable.

In the unmodified liquid diene rubber (B'), the content of the monomer units other than the butadiene and isoprene units is preferably not more than 50 mass %, more preferably not more than 40 mass %, and still more preferably not more than 30 mass %. When, for example, the content of vinyl aromatic compound (b2) units is the above value or less, the processability of the rubber composition tends to be enhanced.

The unmodified liquid diene rubber (B') is preferably a polymer obtained by polymerizing a conjugated diene and optionally additional monomers other than conjugated dienes by a process such as, for example, emulsion polymerization or solution polymerization.

The emulsion polymerization process may be a known process or a process that is deemed as known. For example, monomers including a prescribed amount of the conjugated diene may be emulsified and dispersed in the presence of an emulsifier and may be emulsion polymerized with use of a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

Usually, water is used as a dispersant. The dispersant may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the obtainable unmodified liquid diene rubber (B'), a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with, for example, the type of the radical polymerization initiator used. The temperature is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the liquid diene rubber (B') is coagulated by the addition of a coagulant salt such as sodium chloride, calcium chloride or potassium chloride optionally together with an acid such as nitric acid or sulfuric acid to control the pH of the coagulated system to a predetermined value. The dispersion solvent is then separated, thereby recovering the polymer. Next, the polymer is washed with water, dehydrated and dried. In this manner, the liquid diene rubber (B') may be obtained. During the coagulation process, the latex may be mixed together with an emulsified dispersion of an extender oil as required, and the unmodified liquid diene rubber (B') may be recovered as an oil-extended rubber.

The solution polymerization process may be a known process or a process that is deemed as known. For example, monomers including the conjugated diene are polymerized in a solvent with a Ziegler catalyst, a metallocene catalyst or an active metal or an active metal compound capable of catalyzing anionic polymerization, optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Of these organoalkali metal compounds, organolithium compounds are preferable, and organomonolithium compounds are more preferable.

The amount in which the organoalkali metal compounds are used may be determined appropriately in accordance with factors such as the melt viscosities and molecular weights of the unmodified liquid diene rubber (B') and the modified liquid diene rubber (B). Usually, the amount of such compounds is 0.01 to 3 parts by mass per 100 parts by mass of all the monomers including the conjugated diene.

The organoalkali metal compound may be used in the form of an organoalkali metal amide by being subjected to a reaction with a secondary amine such as dibutylamine, dihexylamine or dibenzylamine.

The polar compounds are usually used for the purpose of controlling the microstructure of conjugated diene moieties without deactivating the anionic polymerization reaction. Examples of the polar compounds include ether compounds such as dibutyl ether, tetrahydrofuran and ethylene glycol diethyl ether; tertiary amines such as tetramethylethylenediamine and trimethylamine; alkali metal alkoxides and phosphine compounds. The polar compounds are usually used in an amount of 0.01 to 1000 mol relative to the organoalkali metal compound.

The temperature of the solution polymerization is usually in the range of −80 to 150° C., preferably 0 to 100° C., and more preferably 10 to 90° C. The polymerization mode may be batchwise or continuous.

The polymerization reaction may be terminated by the addition of a polymerization terminator. Examples of the polymerization terminators include alcohols such as methanol and isopropanol. The unmodified liquid diene rubber (B') may be isolated by pouring the polymerization reaction liquid into a poor solvent such as methanol to precipitate the unmodified liquid diene rubber (B'), or by washing the polymerization reaction liquid with water followed by separation and drying.

Of the processes for producing the unmodified liquid diene rubber (B') described hereinabove, the solution polymerization process is preferable.

The unmodified liquid diene rubber (B') obtained as described above may be directly subjected to the modification with functional groups derived from a silane compound represented by the formula (1) described later, or may be modified after at least part of the unsaturated bonds present in the liquid diene rubber are hydrogenated.

The unmodified liquid diene rubber (B') is modified by the introduction of a functional group derived from a silane compound represented by the formula (1) (hereinafter, also written as the silane compound (1)) into the modified liquid diene rubber (B).

[Chem. 2]

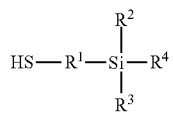

(1)

In the formula (1), $R^1$ is a $C_{1-6}$ divalent alkylene group. Examples of the $C_{1-6}$ divalent alkylene groups include methylene group, ethylene group, propylene group, butylene group, pentylene group and hexylene group. $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

Examples of the silane compounds (1) include mercaptomethylenemethyldiethoxysilane, mercaptomethylenetriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane and 3-mercaptopropylethoxydimethylsilane. The silane compounds may be used singly, or two or more may be used in combination.

The mercapto group (—SH) of the silane compound (1) is radically added to a carbon-carbon unsaturated bond present in the unmodified liquid diene rubber (B'). The resultant modified liquid diene rubber (B) has the functional group derived from the silane compound (1), specifically, a functional group that is the partial structure represented by the following formula (2):

[Chem. 3]

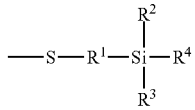

(2)

Details such as definitions and specific examples of $R^1$, $R^2$, $R^3$ and $R^4$ in the formula (2) are the same as those of $R^1$, $R^2$, $R^3$ and $R^4$ in the formula (1).

The average number of functional groups derived from the silane compound (1) per molecule of the modified liquid diene rubber (B) is 1 to 30, preferably 1 to 25, and more preferably 1 to 20. If the average number of functional groups is less than 1, the rubber exhibits a low affinity for the filler (C) and fails to improve the dispersibility of the filler in the rubber composition, with the result that a crosslinked product of the rubber composition sometimes fails to attain the desired properties enhancements, for example, sometimes fails to attain a sufficient reduction of Payne effect. If the average number of functional groups is more than 30, the rubber composition tends to give a crosslinked product which does not attain the desired properties enhancements and which tends to be deteriorated in properties; for example, no reduction in Payne effect is obtained and abrasion resistance tends to be deteriorated.

The average number of functional groups per molecule of the modified liquid diene rubber (B) may be calculated from the functional group equivalent weight (g/eq) and the styrene equivalent number average molecular weight Mn of the modified liquid diene rubber (B).

(Average number of functional groups per molecule)=[(Number average molecular weight Mn)/(Molecular weight of styrene unit)×(Average molecular weight of units of conjugated diene and optional monomers other than conjugated dienes)]/(Functional group equivalent weight)

The functional group equivalent weight of the modified liquid diene rubber (B) indicates the mass of conjugated diene and optional monomers other than conjugated diene that are bonded together per one functional group. The functional group equivalent weight may be calculated from the ratio of the area of the peak assigned to the polymer main chains to the area of the peak assigned to the functional groups using $^1$H-NMR or $^{13}$C-NMR. The peak assigned to the functional groups is a peak assigned to alkoxy groups.

The amount of the silane compound (1) added in the modified liquid diene rubber (B) is preferably 1 to 60 parts by mass per 100 parts by mass of the unmodified liquid diene rubber (B'), and is more preferably 1 to 50 parts by mass, and still more preferably 1 to 40 parts by mass. If the amount of the modifying agent added is larger than 60 parts by mass, the modified liquid diene rubber exhibits poor reactivity with respect to the filler (C) and will not effectively improve the dispersibility of the filler (C), with the result that a crosslinked product that is obtained tends to fail to attain the desired properties enhancements, for example, tends to fail to attain a sufficient reduction in Payne effect and tends to be deteriorated in abrasion resistance. If the amount is less than 1 part by mass, the dispersibility of the filler (C) is not sufficiently improved and the filler (C) tends not to be allowed to be dispersed in a state that is ideal for a crosslinked product to exhibit desired properties, that is, for example, a sufficient reduction in Payne effect tends to be unattainable. The amount of the silane compound (1) added in the modified liquid diene rubber (B) may be determined with various analyzers such as, for example, a nuclear magnetic resonance spectrometer.

The silane compound (1) may be added to the unmodified liquid diene rubber (B') by any method without limitation. For example, the silane compound (1) and optionally a radical catalyst as required may be added to the liquid diene rubber and the mixture may be heated in the presence of or without an organic solvent. The radical generator that is used is not particularly limited and may be any of, among others, organic peroxides, azo compounds and hydrogen peroxide that are usually available in the market.

Examples of the organic peroxides include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy) cyclohexane, 1,1-bis(t-hexylperoxy)cyclohexane, 2,2-bis(t-butylperoxy)butane, t-butylhydroperoxide, cumenehydroperoxide, diisopropylbenzene hydroperoxide, p-menthane hydroperoxide, 1,1,3,3-tetramethylbutyl hydroperoxide, di-t-butyl peroxide, t-butylcumyl peroxide, dicumyl peroxide, bis(t-butylperoxyisopropyl)benzene, 2,5-dimethyl-2,5-di(t-butylperoxy)hexane, 2,5-hexanoyl peroxide, lauroyl peroxide, succinic acid peroxide, benzoyl peroxide and derivatives thereof, 2,4-dichlorobenzoyl peroxide, m-toluoyl peroxide, diisopropyl peroxydicarbonate, t-butyl-2-ethyl hexanoate, di-2-ethylhexyl peroxydicarbonate, dimethoxyisopropyl peroxycarbonate, di(3-methyl-3-methoxybutyl) peroxydicarbonate, t-butyl peroxyacetate, t-butyl peroxypivalate, t-butyl peroxyneodecanoate, t-butyl peroxyoctanoate, t-butyl peroxy-3,3,5-trimethylhexanoate, t-butyl peroxylaurate, t-butyl peroxycarbonate, t-butyl peroxybenzoate and t-butyl peroxyisobutyrate.

Examples of the azo compounds include 2,2'-azobisisobutyronitrile, 1,1'-azobis(cyclohexane-1-carbonitrile), 2,2'-azobis(2-methylbutyronitrile), 2,2'-azobis(2,4-dimethylvaleronitrile), 2,2'-azobis(2,4-dimethyl-4-methoxyvaleronitrile), 2,2'-azobis(2-(2-imidazolin-2-yl) propane), 2,2'-azobis(2,4,4-trimethylpentane), 2,2'-azobis (2-methylpropane), 2,2'-azobis(2-hydroxymethylpropionitrile), 4,4'-azobis(4-cyanovaleric acid), dimethyl 2,2'-azobis(2-methylpropionate), 2-cyano-2-propylazoformamide and 2-phenylazo-4-methoxy-2,4-dimethylvaleronitrile.

For example, the organic solvent used in the above method is usually a hydrocarbon solvent or a halogenated hydrocarbon solvent. Of these organic solvents, hydrocarbon solvents such as n-butane, n-hexane, n-heptane, cyclohexane, benzene, toluene and xylene are preferable.

For purposes such as to suppress side reactions during the addition reaction of the modifying agent by the aforementioned method, an antioxidant may be added.

Some preferred examples of the antioxidants used for such purposes include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy] ethyl]-2,4,8,10-tetraoxaspiro[5.5]undecane (AO-80), 2,4-bis [(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d, f][1,3,2]dioxaphosphepin-6-yloxy)propyl]-2-methylphenol (Sumilizer GP), tris(2,4-di-t-butylphenyl) phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl) sebacate (LA-77Y), N,N-dioctadecylhydroxylamine (Irgastab FS 042) and bis(4-t-octylphenyl)amine (Irganox 5057). The antioxidants may be used singly, or two or more may be used in combination.

The amount of the antioxidants added is preferably 0 to 10 parts by mass, and more preferably 0 to 5 parts by mass per 100 parts by mass of the unmodified liquid diene rubber (B').

In the modified liquid diene rubber (B), the functional groups may be introduced at polymer ends or polymer side chains. The introduction sites are preferably polymer side chains in view of the fact that a plurality of functional groups can be introduced easily. The functional groups may belong to a single kind or may be a mixture of two or more kinds. That is, the modified liquid diene rubber (B) may be modified with a single kind of the modifying agent or with two or more kinds of the modifying agents.

The ratio in which the unmodified liquid diene rubber (B') and the silane compound (1) are mixed together may be selected appropriately so that, for example, the modified liquid diene rubber (B) will have the desired average number of functional groups per molecule. For example, the unmodified liquid diene rubber (B') and the silane compound (1) may be mixed in a mass ratio (B')/(1) of 0.3 to 300.

An effective approach to producing the modified liquid diene rubber (B) with the specific properties is to react the unmodified diene rubber with the silane compound (1) by radical addition reaction at an appropriate reaction temperature for a sufficient amount of reaction time. For example, the addition reaction of the silane compound (1) to the unmodified liquid diene rubber (B') preferably takes place at a temperature of 10 to 200° C., and more preferably 50° C. to 180° C. The reaction time is preferably 1 to 200 hours, more preferably 1 to 100 hours, and still more preferably 1 to 50 hours.

The melt viscosity of the modified liquid diene rubber (B) at 38° C. is preferably 1 to 4,000 Pa·s, more preferably 1 to 3,500 Pa·s, and still more preferably 1 to 3,000 Pa·s. When the melt viscosity of the modified liquid diene rubber (B) is in the above range, the rubber composition that is obtained attains enhanced flexibility and thus exhibits higher processability. In the present invention, the melt viscosity of the liquid diene rubber (B) is a value measured with a Brookfield viscometer at 38° C.

The weight average molecular weight (Mw) of the modified liquid diene rubber (B) is 15,000 to 120,000, preferably 15,000 to 100,000, and more preferably 15,000 to 80,000. In the invention, the Mw of the liquid diene rubber (B) is the weight average molecular weight measured by gel permeation chromatography (GPC) relative to polystyrenes. The above range of the Mw of the modified liquid diene rubber (B) ensures that the process flow efficiency is enhanced and good economic efficiency is obtained, and that the rubber composition of the invention attains good processability. Further, such a modified liquid diene rubber attains enhanced affinity for the filler (C) described later in the obtainable rubber composition and thus will be located more easily near the filler (C) during the preparation of the rubber composition, with the result that the filler (C) is allowed to be dispersed in the rubber composition in a state that is ideal for a crosslinked product to exhibit desired properties (for example, the diene rubber contributes to enhancing the dispersibility of the filler (C)). Thus, in some cases, crosslinked products of the rubber composition attain a sufficient reduction in Payne effect and the filler (C) is excellently dispersed in the crosslinked products. Further, as a result of the facilitated access of the modified liquid rubber (B) to the vicinity of the filler (C), crosslinked products with excellent abrasion resistance can be obtained. By virtue of such advantages, the crosslinked products used in, for example, tires exhibit excellent performances such as steering stability and rolling resistance. In the present invention, two or more kinds of the modified liquid diene rubbers (B) having different molecular weights Mw may be used in combination.

The molecular weight distribution (Mw/Mn) of the modified liquid diene rubber (B) is preferably 1.0 to 20.0, more preferably 1.0 to 15.0, and still more preferably 1.0 to 10.0. This Mw/Mn is advantageous in that the obtainable modified liquid diene rubber (B) has a small variation in viscosity. The molecular weight distribution (Mw/Mn) is the ratio of weight average molecular weight (Mw) to number average molecular weight (Mn) measured by GPC relative to polystyrene standards.

The vinyl content in the modified liquid diene rubber (B) is not more than 70 mol %, and preferably not more than 65 mol %. The vinyl content in the modified liquid diene rubber (B) is preferably not less than 0.5 mol %, and more preferably not less than 1 mol %. In the present invention, the "vinyl content" is the total molar percentage of 1,2-bonded or 3,4-bonded conjugated diene units (conjugated diene units except 1,4-bonded conjugated diene units) relative to the total of isoprene units, butadiene units and conjugated diene (b1) units other than isoprene and butadiene units in the modified liquid diene rubber taken as 100 mol %. The vinyl content may be determined by $^1$H-NMR based on the area ratio of the peaks assigned to 1,2-bonded or 3,4-bonded conjugated diene units and the peak assigned to 1,4-bonded conjugated diene units.

If the vinyl content is above 70 mol %, the modified liquid rubber (B) comes to exhibit a poor compatibility with the solid rubber (A) and fails to allow the filler (C) to be dispersed in the rubber composition in a state that is ideal for a crosslinked product to exhibit desired properties. In such a case, for example, the dispersibility of the filler in the rubber composition may be deteriorated, and a crosslinked product that is obtained tends to attain no reduction in Payne effect and tends to have poor abrasion resistance.

The vinyl content in the modified liquid diene rubber (B) may be brought to the desired value by, for example, selecting the types of a solvent and an optional polar compound used in the production of the unmodified liquid diene rubber (B'), or controlling the production conditions such as polymerization temperature.

The glass transition temperature (Tg) of the modified liquid diene rubber (B) is variable depending on factors such as the vinyl contents in the isoprene units, butadiene units and conjugated diene (b1) units, the type of the conjugated diene (b1) and the content of units derived from monomers other than the conjugated dienes, but is preferably −150 to 50° C., more preferably −130 to 50° C., and still more preferably −130 to 30° C. For example, this Tg ensures that tires which include a crosslinked product of the rubber composition attain good rolling resistance performance, and further ensures that the increase in viscosity is suppressed and the composition can be handled easily.

The modified liquid diene rubbers (B) may be used singly, or two or more may be used in combination.

In the modified liquid diene rubber (B), the catalyst residue content ascribed to the polymerization catalyst used in the rubber production is preferably in the range of 0 to 200 ppm in terms of metal. When, for example, the polymerization catalyst used for the production of the unmodified liquid diene rubber (B'), which is the raw material for the modified liquid diene rubber (B), is an organoalkali metal such as an organolithium compound, the metal based on which the catalyst residue content is determined is the alkali metal such as lithium. The above catalyst residue content ensures that a decrease in tackiness during processing or the like will be avoided and that the rubber composition of the invention will give crosslinked products attaining enhancements in heat resistance and rolling resistance performance of tires. The catalyst residue content ascribed to the polymerization catalyst used in the production of the modified liquid diene rubber (B) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the liquid diene rubber may be controlled to the above specific range by purifying the modified liquid diene rubber (B) or the unmodified liquid diene rubber (B') to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content. From the similar viewpoint, the catalyst residue content in the inventive rubber composition including the solid rubber (A), the modified liquid diene rubber (B) and the filler (C) is preferably 0 to 200 ppm, more preferably 0 to 150 ppm, and still more preferably 0 to 100 ppm in terms of metal. In this case, the catalyst residue content may include a catalyst residue content ascribed to the polymerization catalyst used in the production of the solid rubber (A), the modified liquid diene rubber (B) and/or other components optionally used in the rubber composition.

In the rubber composition of the invention, the content of the modified liquid diene rubber (B) is 0.1 to 50 parts by mass per 100 parts by mass of the solid rubber (A), and is preferably 0.1 to 45 parts by mass, more preferably 0.5 to 40 parts by mass, still more preferably 1 to 40 parts by mass, and further preferably 2 to 40 parts by mass. This content of the modified liquid diene rubber (B) ensures that the filler (C) will be dispersed in the rubber composition in an ideal state (for example, a crosslinked product that is obtained will exhibit a reduced Payne effect), and consequently ensures that abrasion resistance will be enhanced and products such as tires using the composition will attain excellent performances such as steering stability and rolling resistance performance.

[Fillers (C)]

Examples of the fillers (C) used in the rubber composition of the invention include inorganic fillers such as carbon blacks, silicas, clays, micas, calcium carbonate, magnesium hydroxide, aluminum hydroxide, barium sulfate, titanium oxides, glass fibers, fibrous fillers and glass balloons; and organic fillers such as resin particles, wood powders and cork powders. The incorporation of such fillers makes it possible to attain improvements in the properties of the rubber composition such as mechanical strength, heat resistance and weather resistance, to control the hardness and to increase the amount of the rubbers. To attain improvements in properties such as mechanical strength, carbon blacks and silicas are preferable as the fillers (C).

Examples of the carbon blacks include furnace blacks, channel blacks, thermal blacks, acetylene blacks and Ketjen blacks. From the point of view of enhancing the crosslinking rate and the mechanical strength, furnace blacks are preferable among the above carbon blacks. The carbon blacks may be used singly, or two or more may be used in combination.

To attain enhancements in properties such as dispersibility, mechanical strength and hardness, the average particle diameter of the carbon blacks is preferably 5 to 100 nm, more preferably 5 to 80 nm, and still more preferably 5 to 70 nm. The average particle diameter of the carbon blacks may be determined by measuring the diameters of the particles with a transmission electron microscope and calculating the average of the diameters.

Examples of the commercially available furnace blacks include "DIABLACK" manufactured by Mitsubishi Chemical Corporation and "SEAST" manufactured by Tokai Carbon Co., Ltd. Examples of the commercially available acetylene blacks include "DENKA BLACK" manufactured by Denka Company Limited. Examples of the commercially available Ketjen blacks include "ECP600JD" manufactured by Lion Specialty Chemicals Co., Ltd.

To attain enhancements in properties such as the wettability and dispersibility with respect to the solid rubber (A), the carbon blacks may be treated with acids such as nitric acid, sulfuric acid, hydrochloric acid and mixed acids of these acids, or may be subjected to surface oxidation treatment by heating in the presence of air. To enhance the mechanical strength of the inventive rubber composition and crosslinked products obtained from the composition, the carbon blacks may be heat treated at 2,000 to 3,000° C. in the presence of a graphitization catalyst. Preferred examples of the graphitization catalysts include boron, boron oxides (for example, $B_2O_2$, $B_2O_3$, $B_4O_3$ and $B_4O_5$), boron oxoacids (for example, orthoboric acid, metaboric acid and tetraboric acid) and salts thereof, boron carbides (for example, $B_4C$ and $B_6C$), boron nitride (BN) and other boron compounds.

The carbon blacks may be used after their grain size is adjusted by a technique such as crushing. Examples of the grinders which may be used for the crushing of the carbon blacks include high-speed rotary crushers (hammer mills, pin mills and cage mills), various ball mills (rotary mills, vibration mills and planetary mills) and stirring mills (bead mills, Attritor mills, flow tube type mills and annular mills).

Examples of the silicas include wet silicas (hydrous silicates), dry silicas (silicic anhydrides), calcium silicates and aluminum silicates. Of these silicas, wet silicas are preferable to attain further enhancements in processability, mechanical strength and abrasion resistance. The silicas may be used singly, or two or more may be used in combination.

To attain enhancements in processability, rolling resistance performance, mechanical strength and abrasion resistance, the average particle diameter of the silicas is preferably 0.5 to 200 nm, more preferably 5 to 150 nm, and still more preferably 10 to 100 nm. The average particle diameter of the silicas may be determined by measuring the diameters of the particles with a transmission electron microscope and calculating the average of the diameters.

Of the carbon blacks and the silicas described above, the silicas are more preferable from the point of view of aspects such as enhancing the rolling resistance performance of the obtainable rubber composition and crosslinked products thereof.

In the rubber composition of the invention, the content of the filler (C) is 20 to 200 parts by mass per 100 parts by mass of the solid rubber (A), and is preferably 20 to 180 parts by mass, and more preferably 25 to 150 parts by mass. This content of the filler (C) ensures that processability, rolling resistance performance, mechanical strength and abrasion resistance will be enhanced.

When any filler other than the silicas and the carbon blacks is used as the filler (C), the content thereof is preferably 20 to 120 parts by mass per 100 parts by mass of the solid rubber (A), and is more preferably 20 to 90 parts by mass, and still more preferably 20 to 80 parts by mass.

The fillers (C) may be used singly, or two or more may be used in combination.

[Additional Components]

The rubber composition of the invention may further include a crosslinking agent (D) for the crosslinking of the rubbers. Examples of the crosslinking agents (D) include sulfur, sulfur compounds, oxygen, organic peroxides, phenolic resins, amino resins, quinone and quinone dioxime derivatives, halogen compounds, aldehyde compounds, alcohol compounds, epoxy compounds, metal halides and organometal halides, and silane compounds. Examples of the sulfur compounds include morpholine disulfide and alkylphenol disulfides. Examples of the organic peroxides include cyclohexanone peroxide, methyl acetoacetate peroxide, t-butyl peroxyisobutyrate, t-butyl peroxybenzoate, benzoyl peroxide, lauroyl peroxide, dicumyl peroxide, di-t-butyl peroxide and 1,3-bis(t-butylperoxyisopropyl)benzene. The crosslinking agents (D) may be used singly, or two or more may be used in combination. From the point of view of the mechanical properties of crosslinked products, the amount of the crosslinking agent (D) is usually 0.1 to 10 parts by mass per 100 parts by mass of the solid rubber (A), and is preferably 0.5 to 10 parts by mass, and more preferably 0.8 to 5 parts by mass.

When, for example, the rubber composition of the invention contains a sulfur crosslinking agent (D) such as sulfur or a sulfur compound for the crosslinking (vulcanization) of the rubbers, the composition may further include a vulcanization accelerator (E). Examples of the vulcanization accelerators (E) include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. The vulcanization accelerators (E) may be used singly, or two or more may be used in combination. The vulcanization accelerator (E) is usually added in an amount of 0.1 to 15 parts by mass, and preferably 0.1 to 10 parts by mass per 100 parts by mass of the solid rubber (A).

When, for example, the rubber composition of the invention contains a sulfur crosslinking agent (D) such as sulfur or a sulfur compound for the crosslinking (vulcanization) of the rubbers, the composition may further include a vulcanization aid (F). Examples of the vulcanization aids (F) include fatty acids such as stearic acid, metal oxides such as zinc oxide, and fatty acid metal salts such as zinc stearate. The vulcanization aids (F) may be used singly, or two or more may be used in combination. The vulcanization aid (F) is usually added in an amount of 0.1 to 15 parts by mass, and preferably 1 to 10 parts by mass per 100 parts by mass of the solid rubber (A).

When the rubber composition of the invention contains a silica as the filler (C), it is preferable that the composition further include a silane coupling agent. Examples of the silane coupling agents include sulfide compounds, mercapto compounds, vinyl compounds, amino compounds, glycidoxy compounds, nitro compounds and chloro compounds.

Examples of the sulfide compounds include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3 triethoxysilylpropyl methacrylate monosulfide and 3-trimethoxysilylpropyl methacrylate monosulfide.

Examples of the mercapto compounds include 3-mercaptopropyltrimethoxysilane, 3-mercaptopropyltriethoxysilane, 2 mercaptoethyltrimethoxysilane and 2-mercaptoethyltriethoxysilane.

Examples of the vinyl compounds include vinyltriethoxysilane and vinyltrimethoxysilane.

Examples of the amino compounds include 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.

Examples of the glycidoxy compounds include γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of the nitro compounds include 3-nitropropyltrimethoxysilane and 3-nitropropyltriethoxysilane.

Examples of the chloro compounds include 3-chloropropyltrimethoxysilane, 3-chloropropyltriethoxysilane, 2-chloroethyltrimethoxysilane and 2-chloroethyltriethoxysilane.

The silane coupling agents may be used singly, or two or more may be used in combination. Of the above silane coupling agents, bis(3-triethoxysilylpropyl) disulfide, bis(3-triethoxysilylpropyl) tetrasulfide and 3-mercaptopropyltrimethoxysilane are preferable because the addition of these compounds provides high effects and is cost-effective.

The silane coupling agent is preferably added in an amount of 0.1 to 30 parts by mass, more preferably 0.5 to 20 parts by mass, and still more preferably 1 to 15 parts by mass per 100 parts by mass of the silica. This content of the silane coupling agent ensures that dispersibility, coupling effects, reinforcing effects and abrasion resistance will be enhanced.

Where necessary, the rubber composition of the invention may include softeners in order to attain improvements in properties such as processability and fluidity while still ensuring that the advantageous effects of the invention are not impaired. Examples of the softeners include process oils such as silicone oils, aromatic oils, TDAEs (treated distilled aromatic extracts), MESs (mild extracted solvates), RAEs (residual aromatic extracts), paraffin oils and naphthenic oils, and resin components such as aliphatic hydrocarbon resins, alicyclic hydrocarbon resins, C9 resins, rosin resins, coumarone-indene resins and phenolic resins. When the rubber composition of the invention contains the process oil as the softener, the content thereof is preferably less than 50 parts by mass per 100 parts by mass of the solid rubber (A).

The rubber composition of the invention may contain additives as required in order to attain enhancements in properties such as weather resistance, heat resistance and oxidation resistance, while still achieving the advantageous effects of the invention. Examples of such additives include antioxidants, waxes, oxidation inhibitors, lubricants, light stabilizers, scorch inhibitors, processing aids, colorants such as pigments and coloring matters, flame retardants, antistatic agents, matting agents, antiblocking agents, UV absorbers, release agents, foaming agents, antibacterial agents, mildew-proofing agents and perfumes. Examples of the oxidation inhibitors include hindered phenol compounds, phosphorus compounds, lactone compounds and hydroxyl compounds. Examples of the antioxidants include amine-ketone compounds, imidazole compounds, amine compounds, phenolic compounds, sulfur compounds and phosphorus compounds. The additives may be used singly, or two or more may be used in combination.

[Methods for Producing Rubber Compositions]

The rubber composition of the invention may be produced by any methods without limitation as long as the components can be mixed homogeneously. Examples of the apparatuses used in the production of the rubber composition include tangential or intermeshing internal kneaders such as kneader-ruders, Brabender mixers, Banbury mixers and internal mixers, single-screw extruders, twin-screw extruders, mixing rolls and rollers. The production of the rubber composition may be usually carried out at a temperature in the range of 70 to 270° C.

[Crosslinked Products]

Crosslinked products may be obtained by crosslinking the rubber composition of the invention. The conditions under which the rubber composition is crosslinked may be selected appropriately in accordance with factors such as use applications. When, for example, the rubber composition is crosslinked (vulcanized) in a mold with use of sulfur or a sulfur compound as the crosslinking agent, the crosslinking (vulcanization) may be usually performed at a crosslinking temperature of 120 to 200° C. and a pressure of 0.5 to 2.0 MPa.

The crosslinked products are preferably such that the modified liquid diene rubber (B) is extracted therefrom with an extraction ratio of not more than 20 mass %, more preferably not more than 15 mass %, and still more preferably not more than 10 mass %.

The extraction ratio may be calculated by soaking 2 g of the crosslinked product into 400 ml of toluene at 23° C. for 48 hours and determining the amount of the modified liquid diene rubber (B) extracted into toluene.

The rubber composition of the invention and the crosslinked product of the rubber composition may be used to constitute at least a portion of a tire. Such tires exhibit excellent rolling resistance performance and good abrasion resistance as a result of the filler (C) being dispersed in an ideal state (for example, as a result of the Payne effect being sufficiently low).

EXAMPLE

The present invention will be described in further detail by presenting Examples hereinbelow without limiting the scope of the invention to such Examples.

The following are the components used in Examples and Comparative Examples.

⟨Solid Rubbers (A)⟩

Solution polymerized styrene butadiene rubber: HPR355 (manufactured by JSR Corporation, styrene content: 28 mass %, vinyl content: 56 mass %)

Butadiene rubber: BRO1 (manufactured by JSR Corporation, Mw: 550,000, cis content: 95 mass %)

Natural rubber: STR20 (manufactured by VON BUNDIT CO., LTD.)

Emulsion polymerized styrene butadiene rubber: JSR1500 (manufactured by JSR Corporation)

⟨Modified Liquid Diene Rubbers (B)⟩

Modified liquid diene rubbers obtained in Production Examples 1 to 11 described later, and liquid diene rubbers obtained in Production Examples 12 to 14 described later ⟨Fillers (C)⟩

Silica: ULTRASIL 7000GR (manufactured by Evonik Degussa Japan, wet silica, average particle diameter: 14 nm)

Carbon black: DIABLACK I (N220) (manufactured by Mitsubishi Chemical Corporation, average particle diameter: 20 nm)

⟨Crosslinking Agent (D)⟩

Sulfur (sulfur fine powder 200 mesh, manufactured by Tsurumi Chemical Industry Co., Ltd.)

⟨Vulcanization Accelerators (E)⟩

Vulcanization accelerator (1): Nocceler CZ-G (manufactured by Ouchi Shinko Chemical Industrial Co., Ltd.)

Vulcanization accelerator (2): Nocceler D (manufactured by Ouchi Shinko Chemical Industrial Co., Ltd.)

Vulcanization accelerator (3): Nocceler TBT-N (manufactured by Ouchi Shinko Chemical Industrial Co., Ltd.)

Vulcanization accelerator (4): Sanceler NS (manufactured by SANSHIN CHEMICAL INDUSTRY CO., LTD.)

Vulcanization accelerator (5): Nocceler M (manufactured by Ouchi Shinko Chemical Industrial Co., Ltd.)

⟨Vulcanization Aids (F)⟩

Stearic acid: LUNAC S-20 (manufactured by Kao Corporation)

Zinc oxide: zinc oxide (manufactured by Sakai Chemical Industry Co., Ltd.)

⟨Optional Components⟩

TDAE: VivaTec 500 (manufactured by H&R)

Silane coupling agent (1): Si-75 (manufactured by Evonik Degussa Japan)

Silane coupling agent (2): A-137 (manufactured by Momentive Performance Materials)

Antioxidant (1): Nocrac 6C (manufactured by Ouchi Shinko Chemical Industrial Co., Ltd.)

Antioxidant (2): ANTAGE RD (manufactured by Kawaguchi Chemical Industry Co., LTD.)

Wax: SUNTIGHT S (manufactured by Seiko Chemical Co., Ltd.)

Production Example 1: Production of Modified Liquid Diene Rubber (B-1)

A thoroughly dried 5 L autoclave was purged with nitrogen and was loaded with 1220 g of cyclohexane and 131 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-1).

Subsequently, a 1 L-volume autoclave was loaded with 640 g of the unmodified liquid diene rubber (B'-1) obtained above, and the system was deaerated with nitrogen while performing stirring at 60° C. for 3 hours. There were added 4.5 g of 2,2'-azobis(2-methylbutyronitrile) and 78 g of (3-mercaptopropyl)triethoxysilane. The reaction was performed at 80° C. for 24 hours. A modified liquid diene rubber (B-1) was thus obtained.

Production Example 2: Production of Modified Liquid Diene Rubber (B-2)

A thoroughly dried 5 L autoclave was purged with nitrogen and was loaded with 1280 g of cyclohexane and 66 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-2).

Subsequently, a 1 L-volume autoclave was loaded with 700 g of the unmodified liquid diene rubber (B'-2) obtained above, and the system was deaerated with nitrogen while performing stirring at 60° C. for 3 hours. There were added 5.0 g of 2,2'-azobis(2-methylbutyronitrile) and 8.8 g of (3-mercaptopropyl)trimethoxysilane. The reaction was performed at 80° C. for 24 hours. A modified liquid diene rubber (B-2) was thus obtained.

Production Example 3: Production of Modified Liquid Diene Rubber (B-3)

A thoroughly dried 5 L autoclave was purged with nitrogen and was loaded with 1280 g of cyclohexane and 66 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-3).

Subsequently, a 1 L-volume autoclave was loaded with 650 g of the unmodified liquid diene rubber (B'-3) obtained above, and the system was deaerated with nitrogen while performing stirring at 60° C. for 3 hours. There were added 4.6 g of 2,2'-azobis(2-methylbutyronitrile) and 66 g of (3-mercaptopropyl)trimethoxysilane. The reaction was performed at 80° C. for 24 hours. A modified liquid diene rubber (B-3) was thus obtained.

Production Example 4: Production of Modified Liquid Diene Rubber (B-4)

A thoroughly dried 5 L autoclave was purged with nitrogen and was loaded with 1320 g of cyclohexane and 33 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-4).

Subsequently, a 1 L-volume autoclave was loaded with 700 g of the unmodified liquid diene rubber (B'-4) obtained above, and the system was deaerated with nitrogen while performing stirring at 60° C. for 3 hours. There were added 5.0 g of 2,2'-azobis(2-methylbutyronitrile) and 21 g of (3-mercaptopropyl)trimethoxysilane. The reaction was performed at 80° C. for 24 hours. A modified liquid diene rubber (B-4) was thus obtained.

Production Example 5: Production of Modified Liquid Diene Rubber (B-5)

A thoroughly dried 5 L autoclave was purged with nitrogen and was loaded with 1880 g of cyclohexane and 9.9 g of sec-butyllithium (a 10.5 mass % cyclohexane solution). After the temperature had been increased to 50° C., 810 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-5).

Subsequently, a 1 L-volume autoclave was loaded with 710 g of the unmodified liquid diene rubber (B'-5) obtained above, and the system was deaerated with nitrogen while performing stirring at 60° C. for 3 hours. There were added 5.0 g of 2,2'-azobis(2-methylbutyronitrile) and 4.2 g of (3-mercaptopropyl)trimethoxysilane. The reaction was performed at 80° C. for 24 hours. A modified liquid diene rubber (B-5) was thus obtained.

Production Example 6: Production of Modified Liquid Diene Rubber (B-6)

A thoroughly dried 5 L autoclave was purged with nitrogen and was loaded with 1880 g of cyclohexane and 7.8 g of sec-butyllithium (a 10.5 mass % cyclohexane solution). After the temperature had been increased to 50° C., 810 g of isoprene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-6).

Subsequently, a 1 L-volume autoclave was loaded with 690 g of the unmodified liquid diene rubber (B'-6) obtained above, and the system was deaerated with nitrogen while performing stirring at 60° C. for 3 hours. There were added 3.9 g of 2,2'-azobis(2-methylbutyronitrile) and 35 g of (3-mercaptopropyl)trimethoxysilane. The reaction was performed at 80° C. for 24 hours. A modified liquid diene rubber (B-6) was thus obtained.

Production Example 7: Production of Modified Liquid Diene Rubber (B-7)

A thoroughly dried 5 L autoclave was purged with nitrogen and was loaded with 1280 g of cyclohexane and 66 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-7).

Subsequently, a 1 L-volume autoclave was loaded with 700 g of the unmodified liquid diene rubber (B'-7) obtained above, and the system was deaerated with nitrogen while performing stirring at 60° C. for 3 hours. There were added 1.0 g of 1,1-bis(t-hexylperoxy)cyclohexane and 50 g of (3-mercaptopropyl)triethoxysilane. The reaction was performed at 105° C. for 8 hours. A modified liquid diene rubber (B-7) was thus obtained.

Production Example 8: Production of Modified Liquid Diene Rubber (B-8)

A thoroughly dried 5 L autoclave was purged with nitrogen and was loaded with 1280 g of cyclohexane and 66 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-8).

Subsequently, a 1 L-volume autoclave was loaded with 700 g of the unmodified liquid diene rubber (B'-8) obtained above, and the system was deaerated with nitrogen while performing stirring at 60° C. for 3 hours. There were added 4.1 g of 1,1-bis(t-hexylperoxy)cyclohexane and 198 g of (3-mercaptopropyl)triethoxysilane. The reaction was performed at 105° C. for 8 hours. A modified liquid diene rubber (B-8) was thus obtained.

Production Example 9: Production of Modified Liquid Diene Rubber (B-9)

A thoroughly dried 5 L autoclave was purged with nitrogen and was loaded with 50 g of hexane and 1565 g of n-butyllithium (a 17 mass % hexane solution). After the temperature had been increased to 50° C., 52 g of N,N,N',N'-tetramethylethylenediamine and 1000 g of a mixture of butadiene and styrene (which had been prepared by mixing 900 g of butadiene and 100 g of styrene in a tank) were added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-9).

Subsequently, a 1 L-volume autoclave was loaded with 180 g of the unmodified liquid diene rubber (B'-9) obtained above, and the system was deaerated with nitrogen while performing stirring at 60° C. for 3 hours. There were added 1.2 g of 2,2'-azobis(2-methylbutyronitrile) and 518 g of (3-mercaptopropyl)trimethoxysilane. The reaction was performed at 80° C. for 24 hours. A modified liquid diene rubber (B-9) was thus obtained.

Production Example 10: Production of Modified Liquid Diene Rubber (B-10)

A thoroughly dried 5 L autoclave was purged with nitrogen and was loaded with 1400 g of cyclohexane and 89 g of sec-butyllithium (a 10.5 mass % cyclohexane solution). After the temperature had been increased to 50° C., 4.9 g of N,N,N',N'-tetramethylethylenediamine and 1215 g of butadiene were added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-10).

Subsequently, a 1 L-volume autoclave was loaded with 580 g of the unmodified liquid diene rubber (B'-10) obtained above, and the system was deaerated with nitrogen while performing stirring at 60° C. for 3 hours. There were added 4.1 g of 2,2'-azobis(2-methylbutyronitrile) and 133 g of (3-mercaptopropyl)triethoxysilane. The reaction was performed at 80° C. for 24 hours. A modified liquid diene rubber (B-10) was thus obtained.

Production Example 11: Production of Modified Liquid Diene Rubber (B-11)

A thoroughly dried 5 L autoclave was purged with nitrogen and was loaded with 1280 g of cyclohexane and 66 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-11).

Subsequently, a 1 L-volume autoclave was loaded with 700 g of the unmodified liquid diene rubber (B'-11) obtained above, and the system was deaerated with nitrogen while performing stirring at 60° C. for 3 hours. There were added 8.2 g of 1,1-bis(t-hexylperoxy)cyclohexane and 433 g of (3-mercaptopropyl)triethoxysilane. The reaction was performed at 105° C. for 8 hours. A modified liquid diene rubber (B-11) was thus obtained.

Production Example 12: Production of Liquid Diene Rubber (B-12)

A thoroughly dried 5 L autoclave was purged with nitrogen and was loaded with 1300 g of cyclohexane and 52 g of sec-butyllithium (a 10.5 mass % cyclohexane solution). After the temperature had been increased to 50° C., 1350 g of isoprene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (B-12).

Production Example 13: Production of Liquid Diene Rubber (B-13)

A thoroughly dried 5 L autoclave was purged with nitrogen and was loaded with 1220 g of cyclohexane and 131 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (B-13).

Production Example 14: Production of Liquid Diene Rubber (B-14)

A thoroughly dried 5 L autoclave was purged with nitrogen and was loaded with 1280 g of cyclohexane and 66 g of sec-butyllithium (a 10.5 mass % cyclohexane solution). After the temperature had been increased to 50° C., 1350 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B-14).

Properties of the rubbers such as the modified liquid diene rubbers obtained in Production Examples were measured and calculated by the following methods.

(Method for Measuring Weight Average Molecular Weight)

The Mw of the modified liquid diene rubbers (B) was measured by GPC (gel permeation chromatography) relative to standard polystyrenes. The measurement involved the following apparatus and conditions.

Apparatus: GPC apparatus "GPC 8020" manufactured by TOSOH CORPORATION
Separation column: "TSKgel G4000HXL" manufactured by TOSOH CORPORATION
Detector: "RI-8020" manufactured by TOSOH CORPORATION
Fluent: tetrahydrofuran
Fluent flow rate: 1.0 mL/min
Sample concentration: 5 mg/10 mL
Column temperature: 40° C.

(Vinyl Content)

The vinyl content of the modified liquid diene rubbers (B) was measured with $^1$H-NMR (500 MHz) manufactured by JEOL Ltd. The concentration was sample/deuterated chloroform=50 mg/1 mL. The number of scans was 1024. With respect to the spectrum obtained, the vinyl content was calculated from the ratio of the area of the double-bond peak assigned to the vinylated diene compound to the area of the double-bond peak assigned to the non-vinylated diene compound.

(Glass Transition Temperature)

A 10 mg portion of the modified liquid diene rubber (B) was placed into an aluminum pan and was analyzed by differential scanning calorimetry (DSC) at a heat-up rate of 10° C./min. With respect to the thermogram obtained, the peak top value of the DDSC curve was adopted as the glass transition temperature.

(Method for Measuring Melt Viscosity at 38° C.)

The melt viscosity of the modified liquid diene rubbers (B) at 38° C. was measured with a Brookfield viscometer (manufactured by BROOKFIELD ENGINEERING LABS. INC.).

(Average Number of Functional Groups Per Molecule of Modified Liquid Diene Rubber (B))

The average number of functional groups per molecule of the modified liquid diene rubber (B) may be calculated from the functional group equivalent weight (g/eq) and the styrene equivalent number average molecular weight Mn of the modified liquid diene rubber (B).

(Average number of functional groups per molecule)=[(Number average molecular weight Mn)/(Molecular weight of styrene unit)×(Average molecular weight of units of conjugated diene and optional monomers other than conjugated dienes)]/(Functional group equivalent weight)

The functional group equivalent weight of the modified liquid diene rubber (B) indicates the mass of conjugated diene and optional monomers other than conjugated diene that are bonded together per one functional group. The functional group equivalent weight may be calculated from the ratio of the area of the peak assigned to the polymer main chains to the area of the peak assigned to the functional groups using $^1$H-NMR or $^{13}$C-NMR. The peak assigned to the functional groups is a peak assigned to alkoxy groups.

Table 1 below describes the properties of the modified liquid diene rubbers (B-1) to (B-11) and the liquid diene rubbers (B-12) to (B-14) obtained in Production Examples 1 to 14.

TABLE 1

| Modified liquid diene rubbers | Weight average molecular weight (×10$^3$) | Vinyl content (mol %) | Tg (° C.) | Melt viscosity (38° C.) (Pa · s) | Average number of functional groups per molecule (groups) |
|---|---|---|---|---|---|
| Modified liquid diene rubber (B-1) | 15 | 15 | −92 | 9 | 4 |
| Modified liquid diene rubber (B-2) | 30 | 10 | −92 | 70 | 1 |
| Modified liquid diene rubber (B-3) | 30 | 10 | −92 | 70 | 8 |
| Modified liquid diene rubber (B-4) | 60 | 10 | −92 | 500 | 5 |
| Modified liquid diene rubber (B-5) | 120 | 9 | −92 | 2000 | 2 |
| Modified liquid diene rubber (B-6) | 120 | 9 | −63 | 2000 | 20 |

TABLE 1-continued

| Modified liquid diene rubbers | Weight average molecular weight (×10³) | Vinyl content (mol %) | Tg (° C.) | Melt viscosity (38° C.) (Pa · s) | Average number of functional groups per molecule (groups) |
|---|---|---|---|---|---|
| Modified liquid diene rubber (B-7) | 30 | 10 | −88 | 90 | 4 |
| Modified liquid diene rubber (B-8) | 30 | 10 | −84 | 250 | 16 |
| Modified liquid diene rubber (B-9) | 0.5 | 50 | −45 | 0.5 | 4 |
| Modified liquid diene rubber (B-10) | 20 | 75 | −35 | 200 | 10 |
| Modified liquid diene rubber (B-11) | 30 | 10 | −80 | 400 | 35 |
| Liquid diene rubber (B-12) | 30 | 10 | −63 | 70 | 0 |
| Liquid diene rubber (B-13) | 15 | 15 | −92 | 9 | 0 |
| Liquid diene rubber (B-14) | 30 | 10 | −94 | 40 | 0 |

Examples 1 to 11 and Comparative Examples 1 to 11

The solid rubber (A), the modified liquid diene rubber (B), the filler (C), TDAE, the silane coupling agent, zinc oxide, stearic acid, the wax and the antioxidant were added in the amounts (parts by mass) described in Tables 2, 3 and 4 into an internal Banbury mixer and were kneaded together for 6 minutes from a start temperature of 60° C. to a resin temperature of 150° C. Thereafter, the kneaded mixture was removed from the mixer and was cooled to room temperature. Next, the mixture was placed into the Banbury mixer again, and the vulcanizing agent and the vulcanization accelerators were added. The resultant mixture was kneaded for 75 seconds from a start temperature of 50° C. to a maximum temperature of 100° C. A rubber composition was thus obtained.

The rubber composition obtained was subjected to press forming (at 160° C. for 30 to 50 minutes in Examples 1 to 9 and 11 and in Comparative Examples 1 to 7, 10 and 11, and at 145° C. for 20 to 30 minutes in Example 10 and in Comparative Examples 8 and 9) to give a vulcanized rubber sheet (2 mm in thickness). The sheet was tested by the methods described below to evaluate the Payne effect, the rolling resistance performance and the abrasion resistance. The results are described in Tables 2, 3 and 4.

The measurement methods for the above evaluations will be described below.
(Payne Effect)

The sheets of the rubber compositions prepared in Examples and Comparative Examples were cut into test pieces 40 mm in length and 5 mm in width. The test pieces were tested on a dynamic viscoelastometer manufactured by GABO GmbH at a measurement temperature of 25° C. to measure the storage modulus E' (0.5%) at 0.5% strain and the storage modulus E' (5.0%) at 5.0% strain. The difference (in absolute value) between E' (0.5%) and E' (5.0%) was calculated. The data obtained in Examples and Comparative Examples are values relative to the value of Comparative Example 1 in Table 2, that of Comparative Example 8 in Table 3 and that of Comparative Example 10 in Table 4 taken as 100. The smaller the value, the lower the Payne effect and the higher the silica dispersibility.
(Rolling Resistance Performance)

The sheets of the rubber compositions prepared in Examples and Comparative Examples were cut to give test pieces 40 mm in length and 5 mm in width. The test pieces were tested on a dynamic viscoelastometer manufactured by GABO GmbH at a measurement temperature of 60° C., a frequency of 10 Hz, a static strain of 10% and a dynamic strain of 2% to determine tan δ as an indicator of rolling resistance performance. The data obtained in Examples and Comparative Examples are values relative to the value of Comparative Example 1 in Table 2, that of Comparative Example 8 in Table 3 and that of Comparative Example 10 in Table 4 taken as 100. The smaller the value, the more excellent the rolling resistance performance of the rubber composition.
(Abrasion Resistance)

The DIN abrasion loss was measured with a load of 10 N and an abrasion distance of 40 in in accordance with HS K 6264. The data of Examples and Comparative Examples shown in Tables 2, 3, and 4 are values relative to the reciprocals of the DIN abrasion loss obtained in Comparative Example 1 in Table 2, that obtained in Comparative Example 8 in Table 3 and that obtained in Comparative Example 10 in Table 4 taken as 100. The larger the value, the smaller the abrasion loss and the more excellent the abrasion resistance.

TABLE 2

| | | | Examples | | | | | | | |
|---|---|---|---|---|---|---|---|---|---|---|
| | | | 1 | 2 | 3 | 4 | 5 | 6 | 7 | 8 |
| Amounts (parts by mass) | Components (A) | Solution polymerized styrere butadiene rubber | 80 | 80 | 80 | 80 | 80 | 80 | 80 | 80 |
| | | Butadiene rubber | 20 | 20 | 20 | 20 | 20 | 20 | 20 | 20 |
| | Components (B) | Modified liquid diene rubber (B-1) | 6 | | | | | | | |
| | | Modified liquid diene rubber (B-2) | | 6 | | | | | | |
| | | Modified liquid diene rubber (B-3) | | | 6 | | | | | |
| | | Modified liquid diene rubber (B-4) | | | | 6 | | | | |
| | | Modified liquid diene rubber (B-5) | | | | | 6 | | | |
| | | Modified liquid diene rubber (B-6) | | | | | | 6 | | |

TABLE 2-continued

|  |  |  |  |  |  |  |  |  |
|---|---|---|---|---|---|---|---|---|
|  | Modified liquid diene rubber (B-7) |  |  |  |  |  |  | 6 | 12 |
|  | Modified liquid diene rubber (B-8) |  |  |  |  |  |  |  |  |
|  | Modified liquid diene rubber (B-9) |  |  |  |  |  |  |  |  |
|  | Modified liquid diene rubber (B-10) |  |  |  |  |  |  |  |  |
|  | Modified liquid diene rubber (B-11) |  |  |  |  |  |  |  |  |
|  | Liquid diene rubber (B-12) |  |  |  |  |  |  |  |  |
|  | Liquid diene rubber (B-13) |  |  |  |  |  |  |  |  |
|  | Liquid diene rubber (B-14) |  |  |  |  |  |  |  |  |
| Component (C) | Silica | 100 | 100 | 100 | 100 | 100 | 100 | 100 | 100 |
| Optional components | TDAE | 29 | 29 | 29 | 29 | 29 | 29 | 29 | 23 |
|  | Silane coupling agent (1) | 8 | 8 | 8 | 8 | 8 | 8 | 8 | 8 |
|  | Zinc oxide | 3 | 3 | 3 | 3 | 3 | 3 | 3 | 3 |
|  | Stearic acid | 2.5 | 2.5 | 2.5 | 2.5 | 2.5 | 2.5 | 2.5 | 2.5 |
|  | Wax | 2 | 2 | 2 | 2 | 2 | 2 | 2 | 2 |
|  | Antioxidant (1) | 2.5 | 2.5 | 2.5 | 2.5 | 2.5 | 2.5 | 2.5 | 2.5 |
|  | Sulfur | 1.5 | 1.5 | 1.5 | 1.5 | 1.5 | 1.5 | 1.5 | 1.5 |
|  | Vulcanization accelerator (1) | 0.35 | 0.35 | 0.35 | 0.35 | 0.35 | 0.35 | 0.35 | 0.35 |
|  | Vulcanization accelerator (2) | 0.5 | 0.5 | 0.5 | 0.5 | 0.5 | 0.5 | 0.5 | 0.5 |
|  | Vulcanization accelerator (3) | 1.5 | 1.5 | 1.5 | 1.5 | 1.5 | 1.5 | 1.5 | 1.5 |
|  | Payne effect (0.5% E'-5% E' index) | 74 | 86 | 74 | 75 | 90 | 97 | 75 | 60 |
|  | Rolling resistance performarce (tanδ at 60° C.) (relative value) | 82 | 85 | 80 | 83 | 90 | 94 | 91 | 83 |
|  | Abrasion resistance (relative value) | 113 | 114 | 115 | 115 | 113 | 106 | 116 | 131 |

|  |  |  | Examples | Comparative Examples | | | | | | |
|---|---|---|---|---|---|---|---|---|---|---|
|  |  |  | 9 | 1 | 2 | 3 | 4 | 5 | 6 | 7 |
| Amounts (parts by mass) | Components (A) | Solution polymerized styrere butadiene rubber | 80 | 80 | 80 | 80 | 80 | 80 | 80 | 80 |
|  |  | Butadiene rubber | 20 | 20 | 20 | 20 | 20 | 20 | 20 | 20 |
|  | Components (B) | Modified liquid diene rubber (B-1) |  |  |  |  |  |  |  |  |
|  |  | Modified liquid diene rubber (B-2) |  |  |  |  |  |  |  |  |
|  |  | Modified liquid diene rubber (B-3) |  |  |  |  |  |  |  |  |
|  |  | Modified liquid diene rubber (B-4) |  |  |  |  |  |  |  |  |
|  |  | Modified liquid diene rubber (B-5) |  |  |  |  |  |  |  |  |
|  |  | Modified liquid diene rubber (B-6) |  |  |  |  |  |  |  |  |
|  |  | Modified liquid diene rubber (B-7) |  |  |  |  |  |  |  |  |
|  |  | Modified liquid diene rubber (B-8) | 6 |  |  |  |  |  |  |  |
|  |  | Modified liquid diene rubber (B-9) |  |  | 6 |  |  |  |  |  |
|  |  | Modified liquid diene rubber (B-10) |  |  |  | 6 |  |  |  |  |
|  |  | Modified liquid diene rubber (B-11) |  |  |  |  | 6 |  |  |  |
|  |  | Liquid diene rubber (B-12) |  |  |  |  |  | 6 |  |  |
|  |  | Liquid diene rubber (B-13) |  |  |  |  |  |  | 6 |  |
|  |  | Liquid diene rubber (B-14) |  |  |  |  |  |  |  | 12 |
|  | Component (C) | Silica | 100 | 100 | 100 | 100 | 100 | 100 | 100 | 100 |
|  | Optional components | TDAE | 29 | 35 | 29 | 29 | 29 | 29 | 29 | 23 |
|  |  | Silane coupling agent (1) | 8 | 8 | 8 | 8 | 8 | 8 | 8 | 8 |
|  |  | Zinc oxide | 3 | 3 | 3 | 3 | 3 | 3 | 3 | 3 |
|  |  | Stearic acid | 2.5 | 2.5 | 2.5 | 2.5 | 2.5 | 2.5 | 2.5 | 2.5 |
|  |  | Wax | 2 | 2 | 2 | 2 | 2 | 2 | 2 | 2 |
|  |  | Antioxidant (1) | 2.5 | 2.5 | 2.5 | 2.5 | 2.5 | 2.5 | 2.5 | 2.5 |
|  |  | Sulfur | 1.5 | 1.5 | 1.5 | 1.5 | 1.5 | 1.5 | 1.5 | 1.5 |
|  |  | Vulcanization accelerator (1) | 0.35 | 0.35 | 0.35 | 0.35 | 0.35 | 0.35 | 0.35 | 0.35 |
|  |  | Vulcanization accelerator (2) | 0.5 | 0.5 | 0.5 | 0.5 | 0.5 | 0.5 | 0.5 | 0.5 |
|  |  | Vulcanization accelerator (3) | 1.5 | 1.5 | 1.5 | 1.5 | 1.5 | 1.5 | 1.5 | 1.5 |
|  |  | Payne effect (0.5% E'-5% E' index) | 80 | 100 | 104 | 110 | 133 | 114 | 114 | 96 |
|  |  | Rolling resistance performarce (tanδ at 60° C.) (relative value) | 86 | 100 | 103 | 104 | 101 | 107 | 106 | 128 |
|  |  | Abrasion resistance (relative value) | 114 | 100 | 90 | 95 | 99 | 98 | 104 | 110 |

TABLE 3

|  |  |  | Example | Comparative Examples | |
|---|---|---|---|---|---|
|  |  |  | 10 | 8 | 9 |
| Amounts (parts by mass) | Components (A) | Butadiene rubber | 40 | 40 | 40 |
|  |  | Natural rubber | 60 | 60 | 60 |
|  | Components (B) | Modified liquid diene rubber (B-7) | 6 |  |  |
|  |  | Liquid diene rubber (B-14) |  |  | 6 |
|  | Components (C) | Silica | 80 | 80 | 80 |
|  |  | Carbon black | 10 | 10 | 10 |
|  | Optional components | TDAE | 14 | 20 | 14 |
|  |  | Silane coupling agent (1) | 6.4 | 6.4 | 6.4 |
|  |  | Zinc oxide | 3.5 | 3.5 | 3.5 |
|  |  | Stearic acid | 2 | 2 | 2 |
|  |  | Wax | 1.5 | 1.5 | 1.5 |
|  |  | Antioxidant (1) | 1.5 | 1.5 | 1.5 |
|  |  | Antioxidant (2) | 1 | 1 | 1 |
|  |  | Sulfur | 1.5 | 1.5 | 1.5 |

TABLE 3-continued

|  |  | Example | Comparative Examples | |
|---|---|---|---|---|
|  |  | 10 | 8 | 9 |
|  | Vulcanization accelerator (1) | 1.5 | 1.5 | 1.5 |
|  | Vulcanization accelerator (2) | 1 | 1 | 1 |
|  | Payne effect (0.5% E'-5% E' index) | 88 | 100 | 89 |
|  | Rolling resistance performance (tanδ at 60° C.) (relative value) | 94 | 100 | 107 |
|  | Abrasion resistance (relative value) | 127 | 100 | 117 |

TABLE 4

|  |  |  | Example | Comparative Examples | |
|---|---|---|---|---|---|
|  |  |  | 11 | 10 | 11 |
| Amounts (parts by mass) | Component (A) | Emulsion polymerized styrene butadiene rubber | 100 | 100 | 100 |
|  | Components (B) | Modified liquid diene rubber (B-7) | 10 |  |  |
|  |  | Liquid diene rubber (B-14) |  |  | 10 |
|  | Component (C) | Silica | 80 | 80 | 80 |
|  | Optional components | TDAE | 10 | 10 | 10 |
|  |  | Silane coupling agent (2) | 7.3 | 7.3 | 7.3 |
|  |  | Zinc oxide | 3 | 3 | 3 |
|  |  | Stearic acid | 2.5 | 2.5 | 2.5 |
|  |  | Antioxident (1) | 2.5 | 2.5 | 2.5 |
|  |  | Sulfur | 3 | 3 | 3 |
|  |  | Vulcanization accelerator (2) | 1.5 | 1.5 | 1.5 |
|  |  | Vulcanization accelerator (4) | 1.8 | 1.8 | 1.8 |
|  |  | Vulcanization accelerator (5) | 0.3 | 0.3 | 0.3 |
|  | Payne effect (0.5% E'-5% E' index) |  | 78 | 100 | 79 |
|  | Rolling resistance performance (tanδ at 60° C.) (relative value) |  | 67 | 100 | 104 |
|  | Abrasion resistance (relative value) |  | 256 | 100 | 111 |

INDUSTRIAL APPLICABILITY

The rubber compositions of the present invention have excellent processability and filler dispersibility. Further, when rendered crosslinkable by the addition of a crosslinking agent or the like, the rubber compositions can give crosslinked products which contain the filler dispersed in a state that is ideal for properties enhancements (for example, in such a state that the Payne effect can be reduced) and which thereby attain enhancements in properties such as abrasion resistance. Thus, the compositions of the present invention may be suitably used in applications such as tires and industrial parts including industrial belts and industrial rubber hoses. In particular, the use of the crosslinked products in such applications as tires is advantageous in that not only rolling resistance performance is enhanced but also steering stability can be enhanced.

The invention claimed is:

1. A rubber composition comprising:
   100 parts by mass of a solid rubber (A),
   from 0.1 to 50 parts by mass of a modified liquid diene rubber (B) having a functional group derived from a silane compound, and
   from 20 to 200 parts by mass of a filler (C),
   wherein the modified liquid diene rubber (B) satisfies:
   (i) a weight average molecular weight (Mw), which is a polystyrene equivalent weight average molecular weight measured by gel permeation chromatography, is 15,000 to 100,000,
   (ii) a vinyl content determined by $^1$H-NMR is not more than 70 mol %, and
   (iii) an average number of functional groups per molecule of the modified liquid diene rubber (B), which is calculated from the functional group equivalent weight (g/eq) calculated from the ratio of the area of the peak assigned to the polymer main chains to the area of the peak assigned to the functional groups using $^1$H-NMR or $^{13}$C-NMR and the styrene equivalent number average molecular weight Mn of the modified liquid diene rubber (B), (Average number of functional groups per molecule)=[(Number average molecular weight Mn)/(Molecular weight of styrene unit)×Molar-average molecular weight of all monomer units in an average molecule of the modified liquid diene rubber)]/(Functional group equivalent weight), is from 1 to 20, and
   wherein the silane compound is a compound of formula:

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group, and wherein the modified liquid diene rubber (B) is prepared by adding the silane compound (1) to an unmodified liquid diene rubber (B') with a radical catalyst.

2. The rubber composition according to claim 1, wherein a melt viscosity of the modified liquid diene rubber (B) at 38° C. is from 1 to 4,000 Pa·s.

3. The rubber composition according to claim 1, wherein the modified liquid diene rubber (B) is a polymer comprising a monomer unit derived from isoprene and/or butadiene.

4. The rubber composition according to claim 1, wherein the solid rubber (A) is one or more selected from a natural rubber, a styrene butadiene rubber, a butadiene rubber and an isoprene rubber.

5. The rubber composition according to claim 1, wherein the filler (C) is at least one selected from a carbon black and a silica.

6. A crosslinked product obtained by crosslinking the rubber composition of claim 1.

7. A tire comprising the rubber composition of claim 1.

8. A tire comprising the crosslinked product of claim 6.

9. A rubber composition comprising:
100 parts by mass of a solid rubber (A),
from 0.1 to 50 parts by mass of a modified liquid diene rubber (B) having a functional group derived from a silane compound, and
from 20 to 200 parts by mass of a filler (C),
wherein the modified liquid diene rubber (B) satisfies:
(i) a weight average molecular weight (Mw), which is a polystyrene equivalent weight average molecular weight measured by gel permeation chromatography, is 15,000 to 100,000,
(ii) a vinyl content determined by $^1$H-NMR is not more than 70 mol %, and
(iii) an average number of functional groups per molecule of the modified liquid diene rubber (B), which is calculated from the functional group equivalent weight (g/eq) calculated from the ratio of the area of the peak assigned to the polymer main chains to the area of the peak assigned to the functional groups using $^1$H-NMR or $^{13}$C-NMR and the styrene equivalent number average molecular weight Mn of the modified liquid diene rubber (B), (Average number of functional groups per molecule)=[(Number average molecular weight Mn)/(Molecular weight of styrene unit)×Molar-average molecular weight of all monomer units in an average molecule of the modified liquid diene rubber)]/(Functional group equivalent weight), is from 1 to 20, and wherein the silane compound is a compound of formula:

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

10. The rubber composition according to claim 1, wherein a raw material for the modified liquid diene rubber (B) is an unmodified liquid diene rubber (B') containing 100 mass % of butadiene units.

* * * * *